Feb. 2, 1954  S. D. POOL ET AL  2,667,895
MAGNETICALLY BRAISED CHECK VALVE
Filed Nov. 17, 1950

INVENTORS
STUART D. POOL
ELOF K. KARLSSON

ATT'Y

Patented Feb. 2, 1954

2,667,895

UNITED STATES PATENT OFFICE 2,667,895

MAGNETICALLY BIASED CHECK VALVE

Stuart D. Pool and Elof K. Karlsson, Moline, Ill., assignors to International Harvester Company, a corporation of New Jersey Application November 17, 1950, Serial No. 196,284

6 Claims. (Cl. 137—528)

This invention relates to a new and improved magnetically biased check valve.

The principal object of this invention is to provide means in a valve for normally maintaining the valve in seated position.

An important object of this invention is the provision of means in an automatically operable check valve for maintaining the valve in seated position with a relatively small force, the force arranged and constructed to increase materially as the valve is forced away from its seat.

Another important object of this invention is to supply a check valve with magnetic operating means for normally maintaining the valve in closed position.

A further important object of this invention is to utilize repulsive magnetic forces for maintaining a valve in closed seated position.

A still further important object of this invention is to provide a check valve permitting flow of fluid in one direction only and additionally providing for the normal restriction of passage in the one permitted direction of flow until the fluid attains a predetermined head of pressure.

Another and still further important object of this invention is the provision of means in a magnetic check valve for distributing the fluid flowing through the valve throughout the full annular periphery of the check valve housing.

Other and further important objects of this invention will become apparent from the disclosures in the following specification and accompanying drawing.

Figure 1:
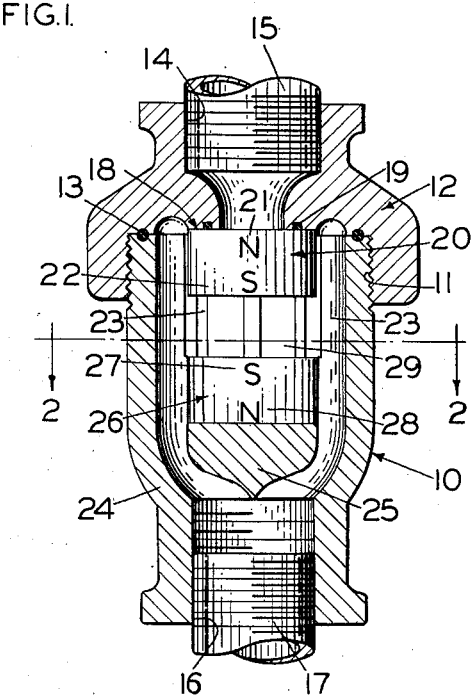
Fig. 1 is a vertical sectional view of the magnetic check valve of this invention.

The reference numeral 10 indicates generally a check valve housing having a threaded collar 11 adapted to receive a bonnet or the like 12. The housing and bonnet are preferably composed of non-magnetic material such as brass. A sealing O ring 13 is provided intermediate the housing 10 and bonnet 12 to insure that the complete housing including the members 10 and 12 is fluid tight. A valve inlet 14 is provided in the top of the bonnet 12 and is adapted to threadedly receive a pipe 15. The lower end of the housing 10 is provided with an outlet 16 adapted to threadedly receive a pipe 17 in the same manner as the inlet 14 and pipe 15. Fluid is thus delivered by means of the pipe 15 to the check valve, and after passing through the valve it is discharged from the check valve by the pipe 17.

An annular check valve seat 18 is provided as a part of the bonnet 12 at a position spaced downwardly or inwardly from the inlet opening 14. The valve seat 18 is equipped with an annular sealing ring 19 of rubber or like material embedded therein for the purpose of insuring a tight seal between a vertically movable valve 20 and the seat 18.

Figure 2:
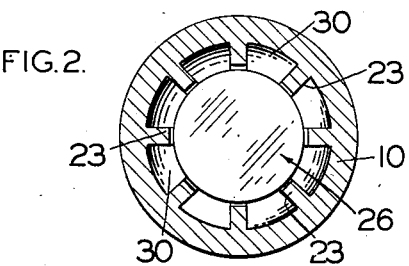
Fig. 2 is a sectional view taken on the line 2—2 of Fig. 1.

The valve 20 comprises a circular disk or cylindrically shaped magnet. Inasmuch as the housing 10 and bonnet 12 are of brass, they do not have any effect on the magnetic valve 20, and hence there will be no attraction or repulsion of the valve member 20 for the annular brass seat 18. The magnetic valve 20 has its north pole at 21 comprising the upper portion of the cylinder and further designated by the letter N. The south pole of the magnet valve 20 is indicated by the numeral 22 constituting the lower half of the valve and further identified by the letter S. The valve 20, as previously stated, has vertical movement within the housing 10. The valve is guided within the housing by means of vertically disposed ribs 23 which, as shown in Fig. 2, are evenly spaced around the inner periphery of the housing and extend radially inwardly from the housing 10. The valve 20 is thus insured straight vertical movement toward and away from the valve seat 18. The ribs 23 perform the added function of providing a uniform distribution of the fluid passing through the valve around the entire periphery of the valve housing 10. Thus when the valve 20 is open, that is, when the valve 20 is moved downwardly away from the seat 18, fluid entering the inlet 14 through the pipe 15 passes down through and under the annular seat 18 and thence laterally outwardly and downwardly around the cylindrical magnet valve 20 whereupon an inwardly curved annular portion 24 of the housing 10 guides the fluid back inwardly around an internal guide or center member 25, thus delivering the fluid through the outlet opening 16 through the pipe 17. The guide or central flow core 25 forms a part of the ribs 23 and is thus rigidly mounted with respect to the housing 10 and guides the flow of fluid within the housing 10 and out through the outlet. The ribs 23 extend from the top of the housing 10 to the bottom of the guide core 25.

A second cylindrical magnet 26 is press-fitted or otherwise fastened within the annular series of vertical ribs 23 and disposed directly on top of this central flow core 25. It should be understood that this second magnet 26 does not have relative movement with the housing 10 but rather remains fixed in the position shown in Fig. 1.

The upper portion of the magnet 26 is designated by the letter S as shown at 27 and thus indicates that the south pole constitutes the upper portion of the magnet. The letter N on the lower half of the magnet 26 as shown at 28 indicates that the north pole is on the bottom thereof. It is thus apparent that the two like poles, in this case the south poles of the magnets 20 and 26, are facing each other with the result that the magnets are constantly repelling each other. Inasmuch as the magnet 20 is the only one capable of shifting movement with respect to the housing 10, the magnet 20 is thus held upwardly by the repelling lines of magnetic force occasioned between the like poles S, 22 and 27 of the magnets 20 and 26. The valve 20 without interference from flow of fluid will be pushed upwardly against the valve seat 18 by reason of the repulsive or opposing forces of the like poles of the adjacent magnets 20 and 26. The space between the magnets designated by the numeral 29 is sufficiently great that it will require only a minimum downward force of fluid pressure to break the valve 20 from the seat 18. The intensities of the magnetic forces of the magnets 20 and 26 and the spacing between magnets may be so arranged that some predetermined fluid pressure entering the valve through the pipe 15 will be required to open the valve 20. Obviously the valve continues to act as a normal check valve inasmuch as fluid entering the pipe 17 would aid in closing the valve 20 against the annular seat 18.

After the valve 20 is moved downwardly away from the seat 18 by reason of fluid entering the inlet 14, the force tending to separate the magnets 20 and 26 increases by the square as the space 29 is diminished. The magnetic check valve of this invention thus acts in three important ways: (1) Operation as a normal check valve; (2) maintenance of the valve in seated position until overcome by a predetermined pressure entering the inlet portion of the valve; and (3) as a cushioning or fluid flow distributor by reason of the impinging forces of the incoming fluid on the yieldable magnetic valve 20 as that valve moves vertically toward and away from the seat 18 depending upon the pressure of the incoming fluid and also the magnetic repulsive forces. The yieldable valve 20 causes the passing fluid to be redirected radially outwardly from its normal vertical flow into the several vertical passages or chambers 30 defined by the evenly spaced apart ribs 23.

In operation, fluid is delivered through the pipe 15 to the inlet 14 of the check valve of this invention whereupon after attaining a predetermined pressure the fluid will cause the magnetic valve 20 to be moved downwardly away from the valve seat 18 and toward the magnet 26. The magnet 26, by reason of its reversed polarity, always opposes downward movement of the valve 20. The fluid is then directed radially outwardly by reason of the yieldable valve 20 into the vertical chambers 30, whereupon the fluid passes downwardly around the fixed magnet 26 and around the central guiding core 25 and thence out the outlet 16 through the pipe 17.

Numerous details of construction may be varied throughout a wide range without departing from the principles disclosed herein, and we therefore do not propose limiting the patent granted hereon otherwise than as necessitated by the appended claims.

What is claimed is:

1. A valve comprising a housing of non-magnetic material having an inlet and an outlet, a seat formed in said housing intermediate said inlet and outlet, a magnetic valve arranged and constructed to move toward and away from said seat, and a second magnetic member fixedly mounted in said housing in alignment with and spaced from said magnetic valve in a position opposite said seat, said magnetic valve and magnetic member having like magnetic poles facing each other whereupon the magnetic repulsive forces urge the magnetic valve against the seat, said magnetic valve being cylindrical in shape and having slidable axial movement within said housing.

2. A valve as set forth in claim 1 in which a plurality of ribs are annularly spaced around the inner periphery of the housing for the purpose of guiding the cylindrically shaped magnetic valve and providing for a plurality of chamber passages outwardly of the magnetic valve for the passage of fluid from the inlet to the outlet.

3. A valve as set forth in claim 2 in which the ribs are vertically disposed and define vertical chamber passages whereby the cylindrically shaped magnetic valve moves in a vertical path.

4. A check valve comprising a housing having an outlet in the bottom thereof, a bonnet fastened to the upper portion of said housing and having an inlet in the top thereof, a seat formed in said bonnet spaced downwardly from said inlet, a cylindrically shaped magnetic valve positioned in said housing and adapted to engage the seat in said bonnet, guide means in said housing arranged to guide the magnetic valve for vertical movement toward and away from said seat, a second magnetic member fixedly mounted in said housing spaced beneath said magnetic valve, said magnetic valve and magnetic member arranged so that their like poles are facing each other.

5. A valve as set forth in claim 4 in which said guide means includes a plurality of vertically disposed arcuately spaced ribs positioned around the inner periphery of said housing.

6. A valve as set forth in claim 5 in which seal means is provided intermediate said housing and bonnet.

STUART D. POOL.
ELOF K. KARLSSON.

References Cited in the file of this patent

UNITED STATES PATENTS

| Number | Name | Date |
|---|---|---|
| 776,377 | Beers | Nov. 29, 1904 |
| 978,729 | Garber | Dec. 13, 1910 |
| 1,090,902 | Beckwith | Mar. 24, 1914 |
| 2,241,983 | Connolly | May 13, 1941 |
| 2,279,076 | Sutton | Apr. 7, 1942 |
| 2,310,562 | Whittington | Feb. 9, 1943 |